US012806979B2

(12) United States Patent
Lee et al.

(10) Patent No.: US 12,806,979 B2

(45) Date of Patent: Nov. 24, 2026

(54) FOLDABLE LOADING BOX COVER ASSEMBLY FOR A VEHICLE

(71) Applicants: HYUNDAI MOTOR COMPANY, Seoul (KR); KIA CORPORATION, Seoul (KR)

(72) Inventors: Jae-Seung Lee, Hwaseong-si (KR); Hyung-Sik Choi, Hwaseong-si (KR); Gook-Hyun Jeon, Hwaseong-si (KR); Woo-Sik Yoon, Incheon (KR); Min-Su Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 217 days.

(21) Appl. No.: 18/767,612

(22) Filed: Jul. 9, 2024

(65) Prior Publication Data

US 2025/0187410 A1 Jun. 12, 2025

(30) Foreign Application Priority Data

Dec. 7, 2023 (KR) ........................ 10-2023-0176727

(51) Int. Cl.

| | |
|---|---|
| ***B60J 7/04*** | (2006.01) |
| ***B60J 7/057*** | (2006.01) |
| ***E05F 15/643*** | (2015.01) |
| ***E05F 15/662*** | (2015.01) |

(52) U.S. Cl.

CPC ............. *B60J 7/041* (2013.01); *B60J 7/0573* (2013.01); *E05F 15/643* (2015.01); *E05F 15/662* (2015.01); *E05Y 2201/684* (2013.01); *E05Y 2900/53* (2013.01)

(58) Field of Classification Search

None

See application file for complete search history.

(56) References Cited

U.S. PATENT DOCUMENTS

| | | | | |
|---|---|---|---|---|
| 4,848,830 A * | 7/1989 | Parson | B60P 3/32 | 296/26.05 |
| 7,036,861 B2 * | 5/2006 | Steffens | B60R 9/00 | 296/100.09 |
| 11,884,145 B2 * | 1/2024 | Pompili | B60R 5/048 | |
| 12,403,752 B2 * | 9/2025 | Hammoud | B60J 7/141 | |
| 2021/0189793 A1 * | 6/2021 | Fowler | B60J 7/068 | |

FOREIGN PATENT DOCUMENTS

| | | |
|---|---|---|
| KR | 20210027558 A | 3/2021 |

* cited by examiner

*Primary Examiner* — Joseph D. Pape

(74) *Attorney, Agent, or Firm* — Lempia Summerfield Katz LLC

(57) ABSTRACT

A foldable loading box cover assembly for a vehicle includes a cover unit including a plurality of slats. The slats are foldable to cover an upper portion of a loading box of the vehicle. The assembly also includes a rail unit disposed in a unfolding direction of the cover unit at the upper portion of the loading box and configured to pop up for guiding an upper end portion and a lower end portion of the plurality of slats to slide. The foldable loading box cover assembly prevents the rail unit from being exposed to an upper portion of the loading box when the upper portion of the loading box is closed.

20 Claims, 15 Drawing Sheets

FOLDABLE LOADING BOX COVER ASSEMBLY FOR A VEHICLE

CROSS-REFERENCE TO RELATED APPLICATION

This application claims priority to Korean Patent Application No. 10-2023-0176727, filed on Dec. 7, 2023, which is incorporated herein by reference in its entirety.

BACKGROUND OF THE DISCLOSURE

Technical Field

The present disclosure relates to a loading box cover for a vehicle, and more specifically, to a foldable loading box cover assembly having a pop-up type rail, which guides a folding operation of a cover unit.

Description of Related Art

Referring to FIG. 1, in a vehicle 100 such as a pickup truck, a load bed, a load box, a loading box, or the like, i.e., a loading box 110 with a predetermined size is disposed at a rear end of the vehicle 100.

The loading box 110 is provided with a cover to protect cargo loaded within the loading box 110. The cover is provided, in one example, in the form of a roll shutter 130 to reduce a volume when stored. When the roll shutter 130 is unrolled or let out, an upper portion of the loading box 110 may be closed to prevent foreign substances such as dust from flowing into cargo loaded in the loading box 110 or to prevent cargo from being separated or ejected from the loading box 110.

The roll shutter 130 is rolled up and accommodated in a case 140 installed inside the loading box 110 so that the roll shutter 130 may be stored by being wound (see portion A of FIG. 2). There is a problem in that an internal space of the loading box 110 is reduced due to a space occupied by the case 140, thereby reducing the available cargo loading space.

In addition, as a height h between a lower surface of the loading box 110 and a lower end portion of the case 140 becomes smaller than a portion in which the case 140 is not installed, there is a problem in that the utilization of a mid-gate 120 provided between a passenger cabin of the vehicle and the loading box 110 is reduced. In other words, by opening the mid-gate 120 so that a portion of lengthy cargo may be stored in a second row seating area of the cabin. As the case 140 protrudes downward, even when the mid-gate 120 is opened, there is a problem in that the case 140 intrudes into a portion of the loading space, thereby limiting use of the loading space.

SUMMARY OF THE DISCLOSURE

The present disclosure has been conceived to solve the above problems. The present disclosure is directed to providing a foldable loading box cover assembly for a vehicle and having a pop-up type rail. The assembly has a portion of a rail for supporting and guiding side surfaces of slats for covering an upper portion or open top of a loading box of the vehicle. The rail pops up or overlaps the loading box in conjunction with an operation of the slats.

In order to achieve these and other objects, a foldable loading box cover assembly for a vehicle having a pop-up type rail is provided. The cover assembly may include a cover unit including a plurality of slats and foldable to cover an upper portion of a loading box of the vehicle. The cover assembly also includes a rail unit which is installed or disposed in a unfolding direction of the cover unit at the upper portion of the loading box. The cover assembly is configured to pop up for guiding an upper end portion and a lower end portion of the plurality of slats to slide.

Each of the plurality of slats is alternately connected to another adjacent slat for folding, and which is folded or unfolded to or from a loading box of the vehicle. The rail unit includes a lower rail installed or disposed at an upper end of the loading box of the vehicle in an unfolding direction of the cover unit and configured to guide the lower ends portion of the slats. The rail unit also includes an upper rail installed or disposed parallel to the lower rail above the lower rail and configured to guide the upper end portions of the slats.

The assembly further includes a plurality of connecting links connecting the lower rail to the upper rail. When the cover unit is folded, the upper rail is popped up, i.e., pops up, from the lower rail to guide the upper ends of the slats to slide.

A plurality of connecting links may be provided at intervals in a longitudinal direction of the vehicle.

At least any one connecting link of the plurality of connecting links may be connected to a sub-link.

The sub-link may be connected to a connecting bar installed or disposed on the lower rail along the lower rail. When the cover unit is unfolded, the slats may pull the connecting bar to support the sub-link to a rear of the vehicle.

The sub-link may be connected to the one connecting link adjacent to a rear end of the vehicle among the plurality of connecting links.

When the cover unit is unfolded, a remote or distal most slat positioned closest to the rear end of the vehicle may support the connecting bar toward the rear of the vehicle.

The connecting bar may be supported toward the rear of the vehicle by a carrier connected to the remote or distal most slat positioned closest to the rear end of the vehicle.

The connecting bar may be connected to the carrier and supported toward the rear of the vehicle by a cable configured to fold or unfold the plurality of slats.

The connecting bar may be elastically supported by a spring toward the front of the vehicle.

A bracket connecting two adjacent slats among the plurality of slats may be provided. A slider in the form of a roller may be installed or disposed on the bracket and configured to slide on the lower rail or the upper rail.

When the cover unit is folded, a slider installed on the bracket connecting the upper ends of two adjacent slats may slide along the lower surface of the upper rail and a slider installed on the bracket connecting the lower ends of two adjacent slats may slide along the upper surface of the lower rail.

A nearest or most proximal slat disposed closet to a front end of the vehicle among the plurality of slats may be rotatably installed on the lower rail.

The foldable loading box loading box cover assembly for a vehicle having the pop-up type rail may further include a connector disposed between two adjacent slats and each of the two adjacent slats may be hinge-connected via the connector.

A weather strip may be provided between the slats and the connector and configured to seal between the two adjacent slats or between each slat and the connector.

The foldable loading box loading box cover assembly for a vehicle having the pop-up type rail may further include a driving motor, a driving gear configured to be rotated by the driving motor, and a cable engaged with the driving gear by a spiral on an outer circumferential surface thereof or by teeth provided in a longitudinal direction of the cable. The cable may be configured to push or pull an end portion of the cover unit according to the rotation of the driving gear. A remote or distal most slat of the cover unit positioned to be maximally spaced apart from the driving motor is pushed to unfold the cover unit or pulled to fold the cover unit.

A pair of cables may be provided and connected to both ends, respectively, of the remote or distal most slat of the cover unit positioned to be maximally spaced apart from the driving motor.

The foldable loading box loading box cover assembly for a vehicle having the pop-up type rail may further include a housing in which the driving motor and the driving gear are installed. The housing may be fixed to the front end of the lower rail and a cable groove in which the cable is installed may be formed in the housing.

A vehicle with a loading box may include a foldable loading box cover assembly having a pop-up type rail according to the above descriptions.

According to the foldable loading box cover assembly for a vehicle having a pop-up type rail of the present disclosure, the upper rail can be popped up from the lower rail in conjunction with the folding of the slats of the cover unit when the upper portion of the loading box is opened to form the operating path of the slat.

In addition, since the upper portion of the loading box is typically planar when the slats close the upper portion of the loading box, the portion protruding to the upper portion of the loading box when the loading box is closed can disappear to make the exterior of the vehicle more appealing.

In addition, since the slats covering the loading box are folded to the upper portion of the loading box, the internal space of the loading box is not reduced.

DESCRIPTION OF SPECIFIC EMBODIMENTS

Figure 1:
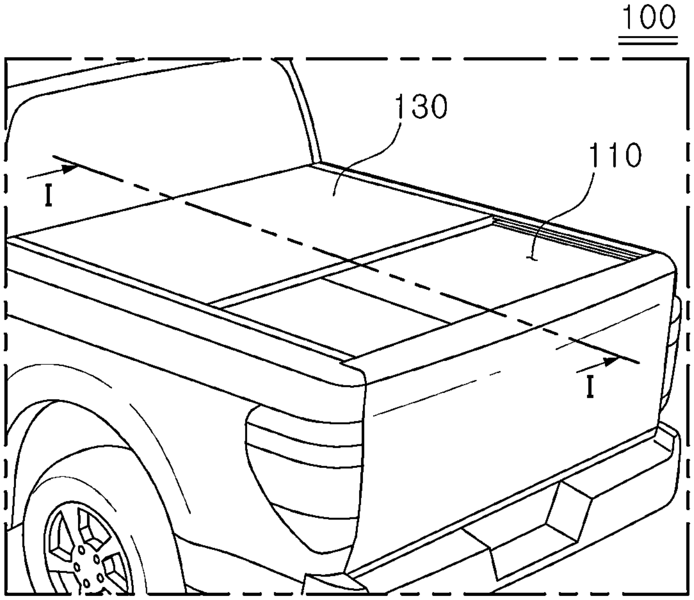
FIG. 1 (PRIOR ART)
FIG. 1 is a perspective view illustrating a state in which a cover is open in a loading box of a vehicle according to a related art.
Figure 2:
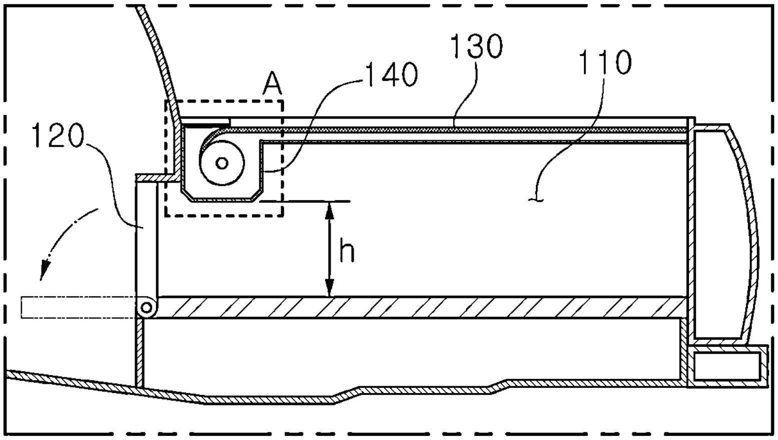
FIG. 2 (PRIOR ART)
FIG. 2 is a cross-sectional view of the loading box and cover assembly taken along line I-I in FIG. 1.
Figure 3:
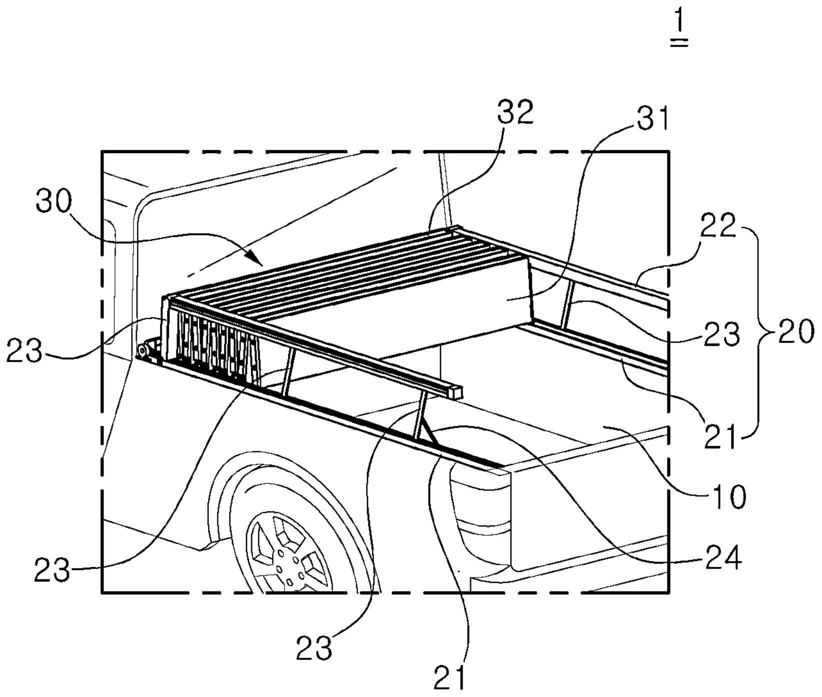
FIG. 3 is a perspective view illustrating a state in which a foldable loading box loading box cover assembly for a vehicle having a pop-up type rail according to the present disclosure is installed on a loading box of the vehicle and the upper portion of the loading box is open.
Figure 4:
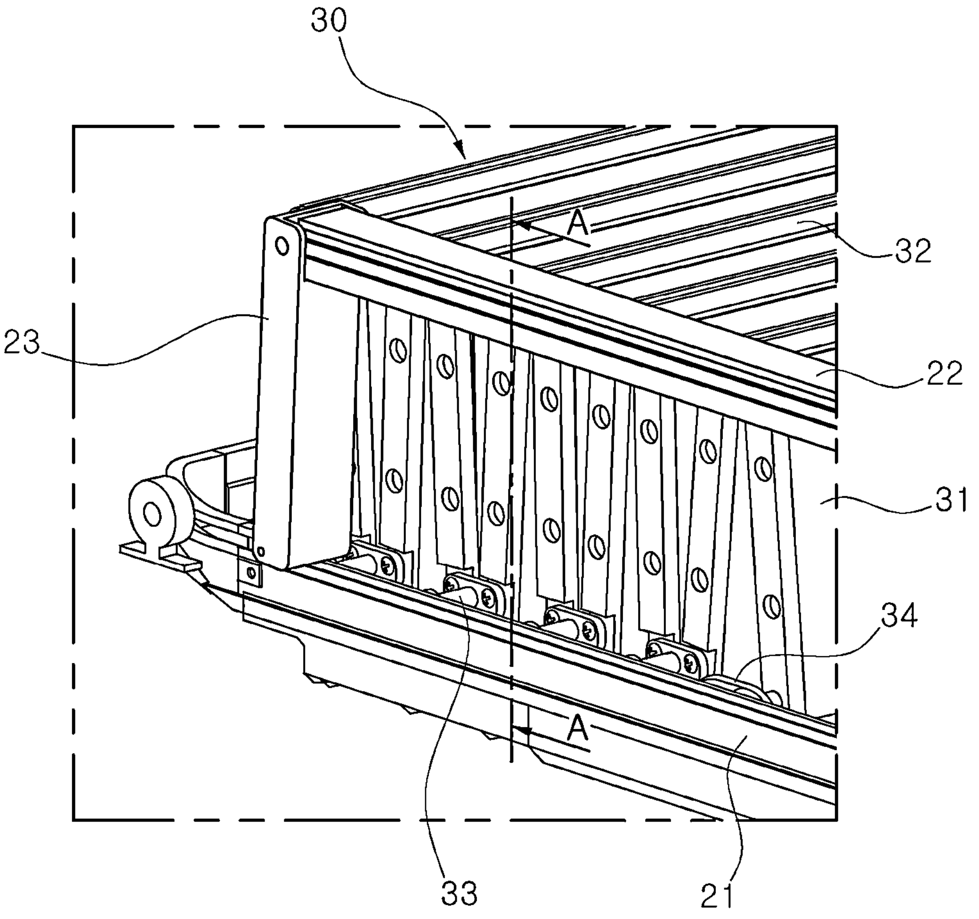
FIG. 4 is a perspective view illustrating the main parts in a state in which the foldable loading box loading box cover assembly for a vehicle having the pop-up type rail according to the present disclosure is folded.
Figure 5:
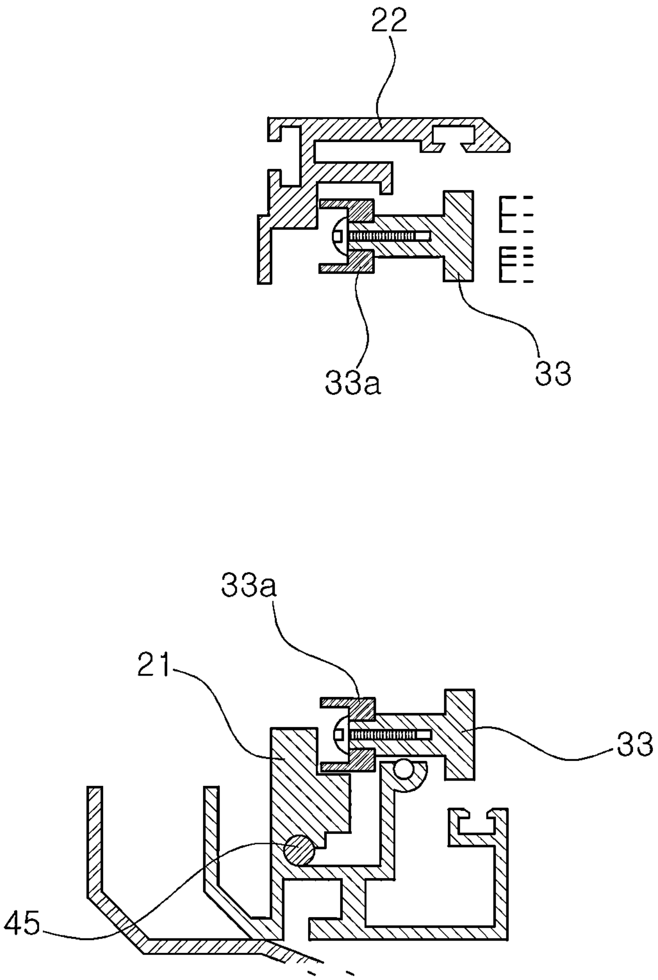
FIG. 5 is a cross-sectional view of the parts of the cover assembly taken along line A-A in FIG. 4.
Figure 6:
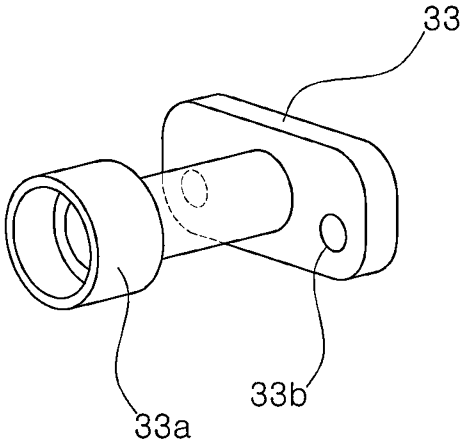
FIG. 6 is a perspective view illustrating a bracket of the foldable loading box cover assembly for a vehicle having the pop-up type rail according to the present disclosure.

Hereinafter, a foldable loading box cover assembly for a vehicle having a pop-up type rail according to the present disclosure is described in detail with reference to the accompanying drawings. When a component, device, element, or the like of the present disclosure is described as having a purpose or performing an operation, function, or the like, the component, device, or element should be considered herein as being "configured to" meet that purpose or perform that operation or function. As used herein for the loading bay cover, upper and lower may refer to portions of the cover when in a folded condition. These same portions may lie generally in the same plane when the cover is in an unfolded or deployed condition and thus may not be consider as upper and lower in the unfolded or deployed condition.

A foldable loading box loading box cover assembly having a pop-up type rail for a vehicle according to the present disclosure may include a cover unit 30. The cover unit 30 includes a plurality of slats 31, in which each slat 31 has an upper end portion and a lower end portion alternately connected to another adjacent slat 31. The cover unit 30 is folded or unfolded to or from a loading box 10 of a vehicle 1. The cover assembly may also include a rail unit 20, which is installed in an unfolding direction of the cover unit 30 at the upper portion of the loading box 10. The rail unit 20 is configured to be popped up, i.e., pop up, for guiding an upper end portion and a lower end portion of each of the plurality of slats 31 to slide.

The rail unit 20 may include a lower rail 21 installed at an upper end of the loading box 10 in the unfolding direction of the cover unit 30. The lower rail 21 may be configured to guide a lower end of each of the slats 31. An upper rail 22 may be installed parallel to the lower rail 21, above the lower rail 21, and configured to guide an upper end of each of the slats 31.

The rail unit 20 further includes a plurality of connecting links 23 connecting the lower rail 21 to the upper rail 22. When the cover unit 30 is folded, i.e., in the folded condition or being folded, the upper rail 22 is popped up from the lower rail 21 to guide the sliding of the upper ends of the slats 31.

The cover unit 30 may include the plurality of slats 31. The slats 31 have the upper ends and the lower ends alternately connected to other adjacent slats 31, and may be folded or unfolded to or from the loading box 10 for the vehicle 1.

The slats 31 may be connected in one direction of the vehicle 1, for example, in a longitudinal or lengthwise direction of the vehicle 1. The slats 31 may be unfolded or folded in the longitudinal direction of the vehicle 1. When the slats 31 are unfolded, an upper portion of the loading box 10 may be closed by the unfolded slats 31 of the cover unit 30. When the slats 31 are folded, an area of an upper portion of the loading box 10 except for some sections may be opened.

The slats 31 may be formed to extend in a width direction of the vehicle 1 more than in the longitudinal direction of the vehicle 1.

As described above, a front end or edge and rear end or edge of the slats 31 in the longitudinal direction of the vehicle 1 may be connected to one another and folded together in the longitudinal direction of the vehicle 1.

Among the slats 31, the slat 31 disposed closest to a front end of the vehicle 1, i.e., the nearest or most proximal slat, may be rotatably connected to the lower rail 21 as described below.

Connectors 32 may be provided with each connector provided to connect two adjacent slats 31 at each side of the vehicle. The connectors 32 may be disposed between the two adjacent slats 31. A shaft (see 37 in FIG. 20) passes through the slats 31 and the connector 32 so that the slats 31 may be folded. For example, both side ends of each slat 31 may be bent and a shaft may pass through the bent portion and the connector 32 on each side end to connect the adjacent slats 31 to the connector 32.

The connector 32 may connect the two adjacent slats 31 at an interval and the connected portions of the slats may rotate to allow the cover unit 30 to be folded or unfolded.

Meanwhile, the slats 31 may each have an extending portion 31*a* formed toward another slat 31 adjacent to an end portion thereof. When the cover unit 30 is unfolded and the slats 31 are disposed along a plane, the extending portion 31*a* may cover a space between the slat 31 and the connector 32.

For when the cover unit 30 is folded or unfolded, a bracket 33 may be installed to guide the movement of the cover unit 30 and to reduce friction. A slider 33*a* in the form of a roller may be provided on each of the brackets 33. When the cover unit 30 is folded, the bracket 33 may be installed to connect the upper and lower ends of the two adjacent slats 31 and the slider 33*a* may be rotatably installed on the bracket 33. The slider 33*a* may be provided in the form of a roller and may make rolling contact during sliding to reduce friction. When the cover unit 30 is folded, the sliders 33*a* alternately slide along the upper rail 22 and lower rail 21, which is described below.

A through hole 33*b* may be formed in each of the brackets 33. The shaft 37 may be installed to pass through the through hole 33*b*, the respective slat 31, and the connector 32.

Figure 20:
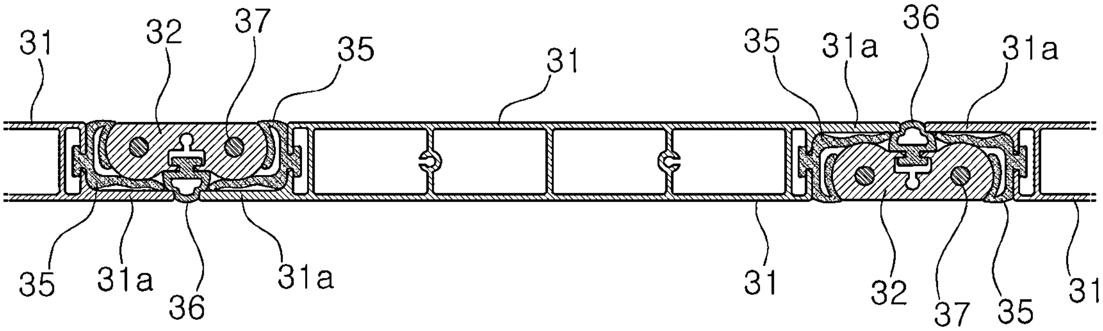
FIG. 20 is a cross-sectional view of the cover assembly taken along line B-B in FIG. 19.

Meanwhile, weather strips 34 and 35 may be provided to seal between the two adjacent slats 31 and between the slats 31 and the connector 32 (see FIG. 20).

The weather strips 34 and 35 may be a slat weather strip 34 that seals between the slats 31 and the connector 32 when the slats 31 are unfolded. The slat weather strip 34 may be installed on an end portion of the slats 31 and provided in the form of surrounding the connector 32. The slat weather strip 34 may surround the connector 32 when the slats 31 are unfolded or folded and seals between the slats 31 and the connector 32.

Alternatively, the weather strips 34 and 35 may be the connector weather strip 35 fastened to the connector 32 to seal between the two adjacent slats 31 when the slats 31 are unfolded. The connector weather strip 35 may be fastened to the connector to seal between the slats 31 while deformed by being compressed between the end portions of the slats 31 when the slats 31 are unfolded.

Since sealing is made between the two adjacent slats 31 and between the slats 31 and the connectors 32 through the weather strips 34 and 35, it is possible to prevent moisture or foreign substances from flowing entering into the loading box 10, thereby preventing contamination of the loading box 10 and any cargo loaded in the loading box 10.

The lower rail 21 may be installed at the upper end of the loading box 10. The lower rail 21 may be installed at the upper end of the loading box 10 in the longitudinal direction of the vehicle 1. The lower rail 21 may have an open upper portion to allow the sliders 33*a* to slide along an upper surface of the lower rail 21. Therefore, the lower rail 21 guides the lower ends of the slats 31 when the cover unit 30 is folded.

The nearest or most proximal slat 31 positioned at a front end of the lower rail 21, i.e., the slat 31 disposed closest to the front end of the vehicle 1 among the slats 31 may be rotatably connected to the lower rail 21. The slat 31 rotatably connected to the lower rail 21 may only rotate alone and may not slide when the cover unit 30 is folded or unfolded.

A cable slot 21*a* accommodating a cable 45 may be formed on the lower rail 21. The cable slot 21*a* may be formed in a direction which is the same as that of the lower rail 21 and may become a passage through which the cable 45 moves when the cover unit 30 is unfolded or folded.

The upper rail 22 may be installed parallel to the lower rail 21 above the lower rail 21. The upper rail 22 may have an open lower surface and the sliders 33*a* slide along the lower surface of the upper rail 22. Therefore, the upper rail 22 may guide the upper ends of the slats 31 when the cover unit 30 is folded. Therefore, the upper rail 22 may guide the upper ends of the slats 31 when the cover unit 30 is folded.

When the cover unit 30 is folded, when the slats 31 are inclined with respect to the lower rail 21 and one end of the slats 31 moves up, the upper rail 22 may be popped up by being separated from the lower rail 21 to guide the sliding of the upper ends of the slats 31.

The connecting links 23 may connect the upper rail 22 to the lower rail 21. An upper end of the connecting links 23 may be hinge-connected to the upper rail 22 and a lower end thereof may be hinge-connected to the lower rail 21. A plurality of connecting links 23 may be disposed at intervals in the longitudinal direction of the vehicle 1 so that the lower rail 21, the upper rail 22, and the connecting links 23 may have a structure of a four-joint link.

The upper rail 22 may overlap the lower rail 21 through the connecting links 23 or may be popped up from the lower rail 21.

In order to maintain a state in which the upper rail 22 overlaps the lower rail 21 in a state in which the cover unit 30 is fully unfolded, a sub-link 24 and a connecting bar 25 may be provided.

The sub-link 24 and the connecting bar 25 may support at least one of the connecting links 23 among the plurality of connecting links 23 to the rear of the vehicle 1 so that the upper rail 22 is fixed in the state of overlapping the lower rail 21 when the cover unit 30 is unfolded.

In addition, the sub-link 24 and the connecting bar 25 may move before the upper rail 22 when the cover unit 30 is folded so that the upper rail 22 may be popped up from the lower rail 21.

An upper end of the sub-link 24 may be linked to the middle of the connecting link 23. When a lower end of the sub-link 24 is pulled toward the rear of the vehicle 1, the sub-link 24 pulls the connecting link 23 to fix the upper rail 22 in the state of overlapping the lower rail 21.

The connecting bar 25 may be installed on the lower rail 21 in the longitudinal direction of the lower rail 21. One end of the connecting bar 25 may be linked to the lower end of the sub-link 24 so that the connecting bar 25 pulls the sub-link 24 or the sub-link 24 pulls the connecting bar 25.

The sub-link 24 and the connecting bar 25 may be connected to be fixed by pulling the connecting link 23 positioned at a rearmost side. In other words, the sub-link 24 may be connected to the connecting link 23 adjacent to the rear end of the vehicle 1 among the plurality of connecting links 23.

When the cover unit 30 is unfolded, the remote or distal most slat 31 positioned closest to the rear end of the vehicle 1 may support the connecting bar 25 toward the rear of the vehicle 1. Thus, the connecting bar 25 may pull the sub-link 24 toward the rear of the vehicle and the sub-link 24 may pull the connecting link 23 toward the rear of the vehicle 1 so that the upper rail 22 overlaps the lower rail 21. Therefore, the upper rail 22 may be fixed to the lower rail 21.

Meanwhile, the connecting bar 25 may be supported toward the rear of the vehicle 1 by the carrier 34 connected to the remote or distal most slat 31 positioned closest to the rear end of the vehicle 1 or the cable 45 connected to the carrier 34. In other words, when the cover unit 30 is unfolded, the slat 31 positioned at the rearmost side may pull the connecting bar 25 toward the rear of the vehicle 1 while moving toward the rear of the vehicle 1.

In addition, a rear end of the connecting bar 25 may be elastically supported toward the front of the vehicle 1 by a spring 26. The spring 26 may push the connecting bar 25 toward the front of the vehicle 1 when the cover unit 30 starts to be unfolded.

The loading box 10 may be provided with a driving motor 43 for folding or unfolding the cover unit 30 and the cable 45 for transmitting a driving force of the driving motor 43.

A housing 41 for installing the driving motor 43 at one side of the loading box 10, for example, at a front end of the loading box 10 and the cover 42 for covering the housing 41 may be installed, and the driving motor 43 may be installed in the housing 41. The driving motor 43 may operate when power is applied to allow the cover unit 30 to be unfolded or folded. A cable groove 41*a*, in which the cable 45 is accommodated, may be formed in the housing 41.

A driving gear 44 may be fixed to the driving motor 43, and the driving gear 44 may be rotated by the driving motor 43. The driving gear 44 may transmit the driving force of the driving motor 43 to the cable 45. The driving gear 44 may be a spur gear with teeth formed therearound.

The cable 45 may be formed to be engaged with the driving gear 44. A spiral may be formed on an outer circumferential surface of the cable 45 or teeth may be formed in the longitudinal direction on the cable 45 to be engaged with the driving gear 44. The cable 45 may have flexibility to be bent along a shape of the cable groove 41*a* or the cable slot 21*a* and may have appropriate rigidity so that the cable 45 pushes the carrier 34 to which the other end of the cable 45 is connected.

Figure 7:
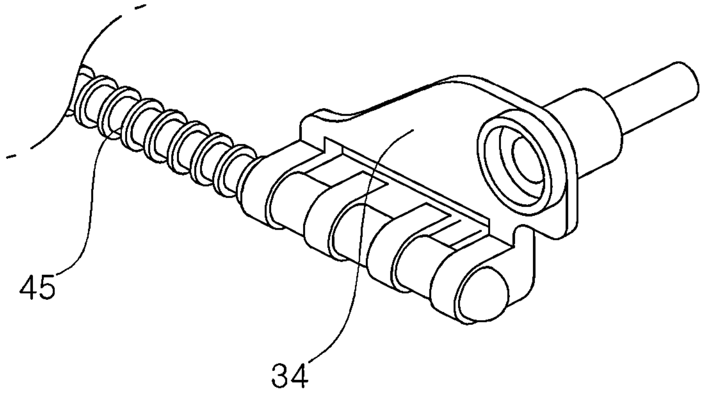
FIG. 7 is a perspective view illustrating a state in which a carrier and a cable are connected in the foldable loading box cover assembly for a vehicle having the pop-up type rail according to the present disclosure.
Figure 8:
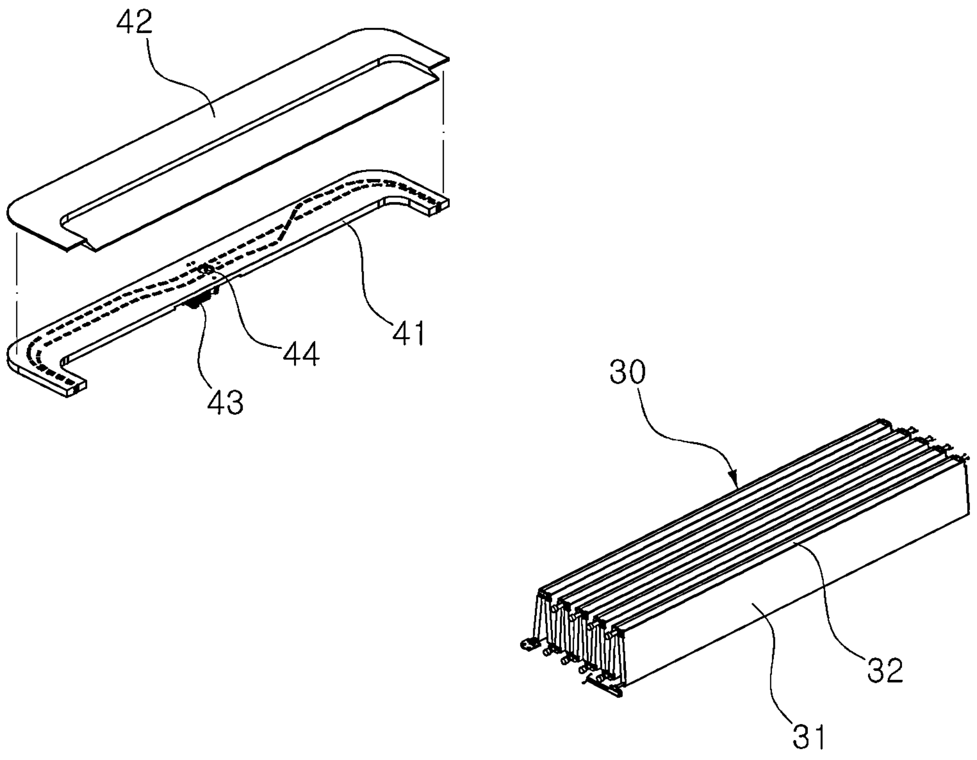
FIG. 8 is an exploded perspective view illustrating the installation relationship between the slats and a cable in the foldable loading box cover assembly for a vehicle having the pop-up type rail according to the present disclosure.
Figure 9:
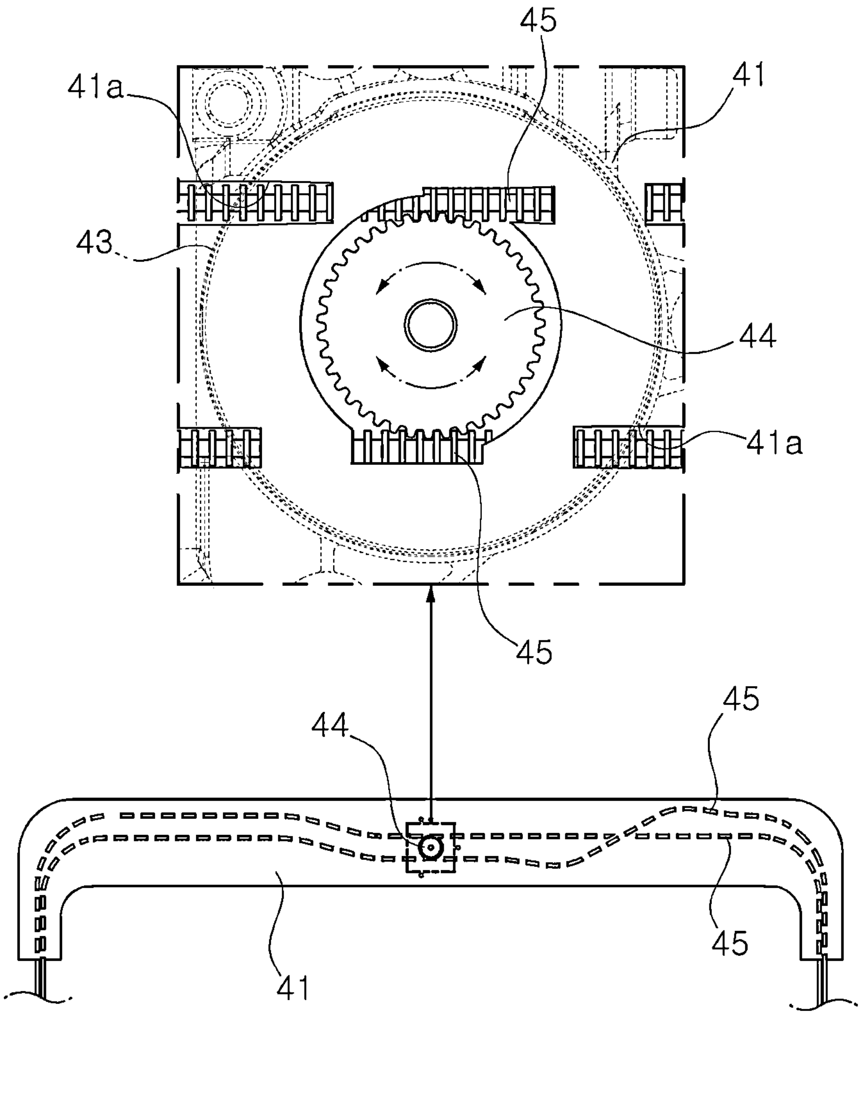
FIG. 9 is a plan view illustrating a state in which the cable is installed on a housing in the foldable loading box cover assembly for a vehicle having the pop-up type rail according to the present disclosure.

Although the cable 45 is shown as being dually installed between the housing 41 and the cover 42, the two cables 45 may be each connected to the driving gear 44 and the slat 31 of the cover unit 30, which is positioned at the rearmost end of the vehicle. FIG. 7 illustrates the carrier 34 connecting the other end of the cable 45 to the slat 31. The carrier 34 may be fixed to the slat 31, and the other end of the cable 45 may be fixed to the carrier 34. One side of the cable 45 may be engaged with the driving gear 44. The other end of the cable 45 may be connected to the remote or distal most slat 31 installed at the rearmost side through the cable slot 21*a*. The two cables 45 may be engaged with the driving gear 44. According to a rotating direction of the driving gear 44, the cables 45 may be pulled toward the driving gear 44 or moved in an opposite direction.

An operation of the foldable loading box cover assembly for a vehicle having the pop-up type rail according to the present disclosure having the above configuration is described as follows.

Figure 10:
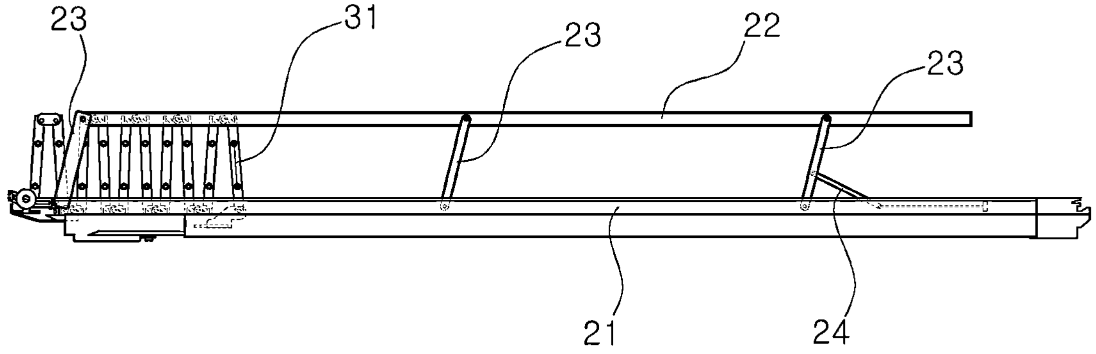
FIG. 10 is a side view illustrating a state in which the foldable loading box cover assembly for a vehicle having the pop-up type rail according to the present disclosure is folded.
Figure 11:
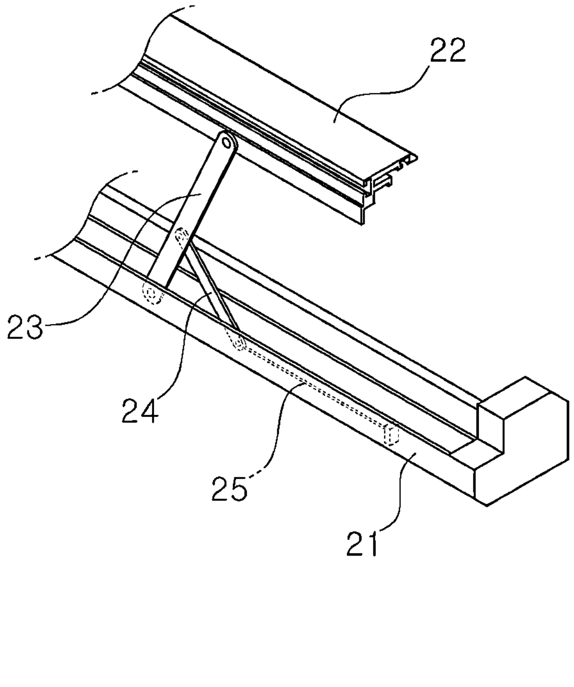
FIG. 11 is a perspective view illustrating a state of an upper rail and a connecting link in the state in which the foldable loading box cover assembly for a vehicle having the pop-up type rail according to the present disclosure is folded.

FIGS. 10 and 11 illustrate a state in which the cover unit 30 is folded. In other words, the slats 31 may be aligned alternatively folded in an upright state and the upper rail 22 may be in a state of being popped up from the lower rail 21. In this state, the upper rail 22 may be in a state of being spaced apart from the loading box 10, the slats 31 may be aligned almost perpendicular to the ground (i.e., in a generally vertical orientation), and the connecting link 23 may be in a state of being maximally inclined with respect to the lower rail 21.

In this state, since the remaining portion, except for a portion in which the cover unit 30 is folded, of the upper portion of the loading box 10 is open, cargo may be loaded into the loading box 10, or the cargo may be unloaded from the loading box 10.

From this state, when the driving motor 43 is operated to close the cover unit 30, the driving motor 43 may rotate the driving gear 44, and the cable or cables 45 may start to move to the rear of the vehicle 1.

When the cable 45 moves to the rear of the vehicle 1, the carrier 34 together with the other end of the cable 45 may also start to move to the rear of the vehicle 1, and the cover unit 30 starts to be unfolded.

Figure 12:
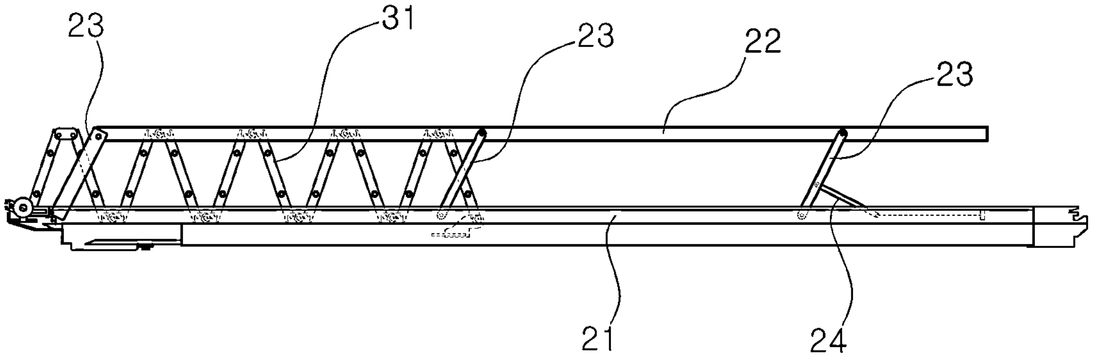
FIG. 12 is a side view illustrating a state in which the foldable loading box cover assembly for a vehicle having the pop-up type rail according to the present disclosure is being unfolded.
Figure 13:
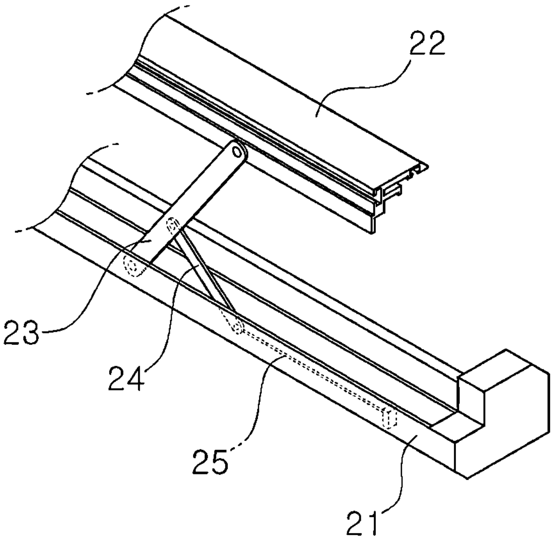
FIG. 13 is a perspective view illustrating a state of the upper rail and the connecting link in the state in which the foldable loading box cover assembly for a vehicle having the pop-up type rail according to the present disclosure is being unfolded.

FIGS. 12 and 13 illustrate an intermediate state between a state in which the cover unit 30 is maximally folded and a state in which the cover unit 30 is fully unfolded. As the cable 45 moves toward the rear of the vehicle, when the carrier 34 pulls the slat 31 positioned at the rearmost side of the cover unit 30 and moves the slat 31 toward the rear of the vehicle, the slats 31 may become in a state of being inclined from a state of being perpendicular to the ground while the remaining slats 31 also move sequentially.

At this time, as the upper ends of the slats 31 move down and the upper rail 22 also moves down, the inclination of the connecting link 23 may also be lowered down.

As described above, while the cover unit 30 is unfolded, a height of the upper ends of the slats 31 may be reduced, and in conjunction with this, the upper rail 22 may also become closer to the lower rail 21. In addition, the lower surface of the upper rail 22 and the upper surface of the lower rail 21 may be in an open state, and the slider **33*a* slides along the lower surface of the upper rail 22 or slides along the upper surface of the lower rail 21**.

As the cover unit 30 is further unfolded, the height of the upper ends of the slats 31 is reduced, and the upper rail 22 may also become closer to the lower rail 21.

In addition, as an inclination angle of the connecting link 23 with respect to the lower rail 21 is reduced, the lower end of the sub-link 24 may push the connecting bar 25 toward the rear of the vehicle 1.

Figure 14:
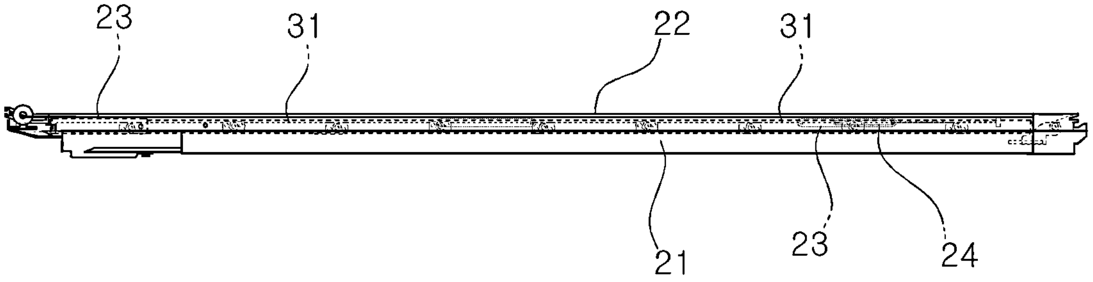
FIG. 14 is a side view illustrating a state in which the foldable loading box cover assembly for a vehicle having the pop-up type rail according to the present disclosure is unfolded.
Figure 15:
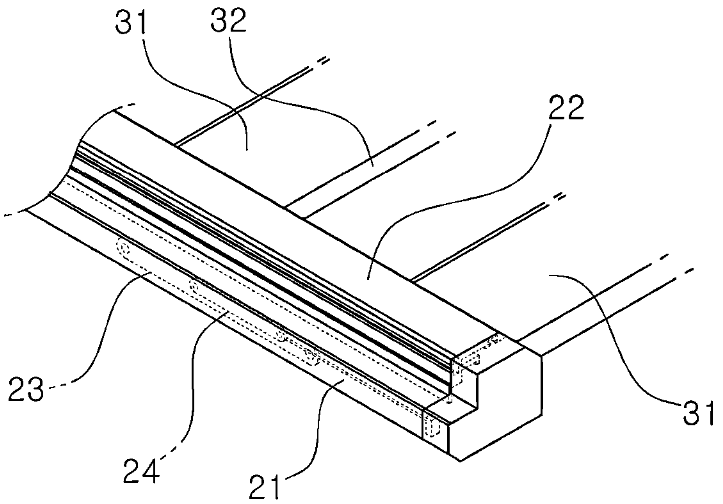
FIG. 15 is a perspective view illustrating a state of the upper rail and the connecting link in the state in which the foldable loading box cover assembly for a vehicle having the pop-up type rail according to the present disclosure is unfolded.

FIGS. 14 and 15 illustrate a state in which the cover unit 30 is fully unfolded. When the cable 45 maximally moves toward the rear of the vehicle 1, the slats 31 of the cover unit 30 become in a state of being parallel to the ground, i.e., in a generally horizontal state or in a state parallel with the upper portion of the loading box 10. In addition, the upper rail 22 may overlap the lower rail 21, and the sliders **33*a* may be positioned between the upper rail 22 and the lower rail 21**.

Figure 16:
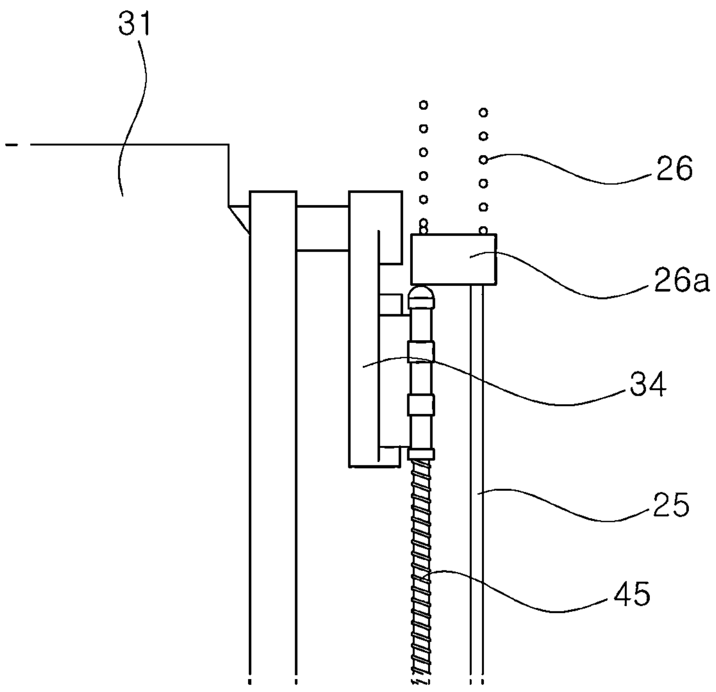
FIG. 16 is a plan view illustrating the relationship between a carrier and a sub-link in the state in which the foldable loading box cover assembly for a vehicle having the pop-up type rail according to the present disclosure is folded.
Figure 17:
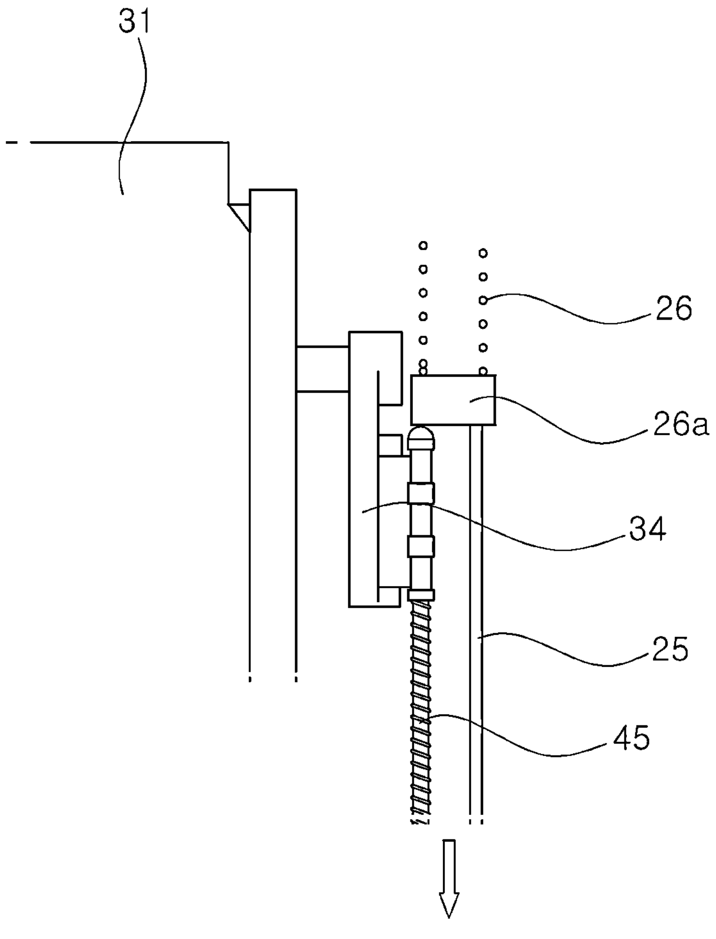
FIG. 17 is a plan view illustrating the relationship between the carrier and the sub-link in the state in which the foldable loading box cover assembly for a vehicle having the pop-up type rail according to the present disclosure is being unfolded.
Figure 18:
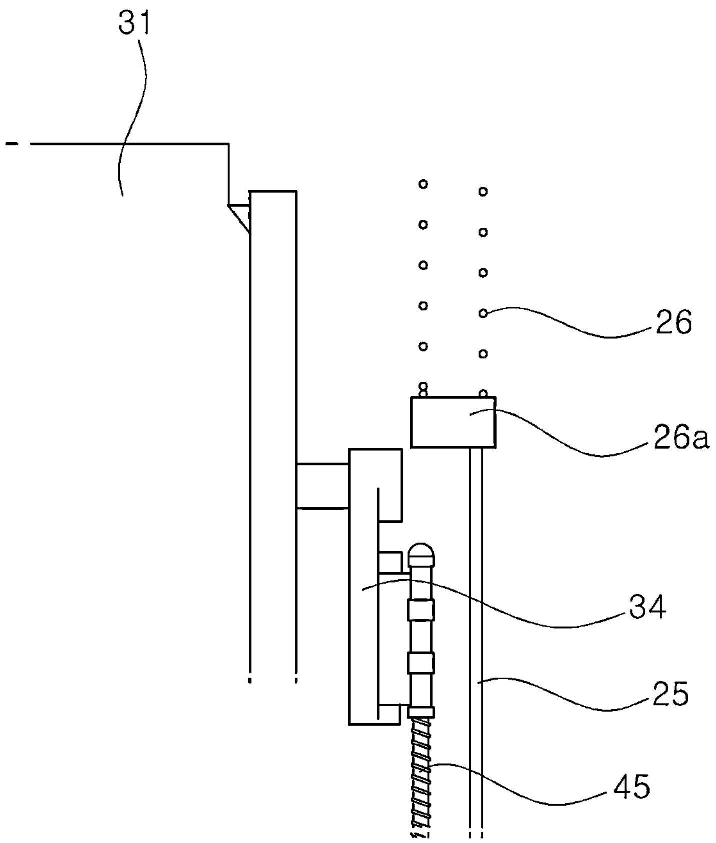
FIG. 18 is a plan view illustrating the relationship between the carrier and the sub-link in the state in which the foldable loading box cover assembly for a vehicle having the pop-up type rail according to the present disclosure is unfolded.

FIGS. 16-18 illustrate a state of the connecting bar 25 for each state of the cover unit 30.

FIG. 16 illustrates the state in which the cover unit 30 is fully unfolded. The carrier 34 connected to the remote or most distal slat 31 positioned at the rearmost side or the cable 45 connected to the carrier 34 may push the spring **26*a* installed at the rear end of the connecting bar 25 toward the rear of the vehicle 1 to support the connecting bar 25 to the rear of the vehicle 1. Therefore, as the connecting bar 25 pushes the sub-link 24 to the rear of the vehicle 1 and the connecting link 23 maximally overlaps the lower rail 21, the lower surface of the upper rail 22 may come into contact with the upper surface of the lower rail 21**, and this state is maintained.

FIG. 17 illustrates the state in which the cover unit 30 starts to be folded. When the slats 31 start to move to the front of the vehicle 1, the spring 26 may push a spring seat **26*a* to move the connecting bar 25 to the front of the vehicle 1**.

Subsequently, when the cover unit 30 is folded, as the slat 31 continuously moves to the front of the vehicle 1, the carrier 34 or the cable 45 may become a state of being separated from the connecting bar 25 (see FIG. 18).

Meanwhile, when the cover unit 30 is unfolded from the folded state, at a time point when unfolding is ended, when the remote or most distal slat 31 closest to the rear end of the vehicle 1 continuously moves to the rear of the vehicle 1 in a state in which the carrier 34 or the cable 45 is close to the other end of the connecting bar 25 (see FIG. 18), the carrier 34 or the cable 45 may come into contact with the spring seat **26*a* and starts to move the connecting bar 25 (see FIG. 17). When the slat 31 moves maximally, the carrier 34 or the cable 45 maximally moves the connecting bar 25 to fix the upper rail 22 in the state of overlapping the lower rail 21**.

Figure 19:
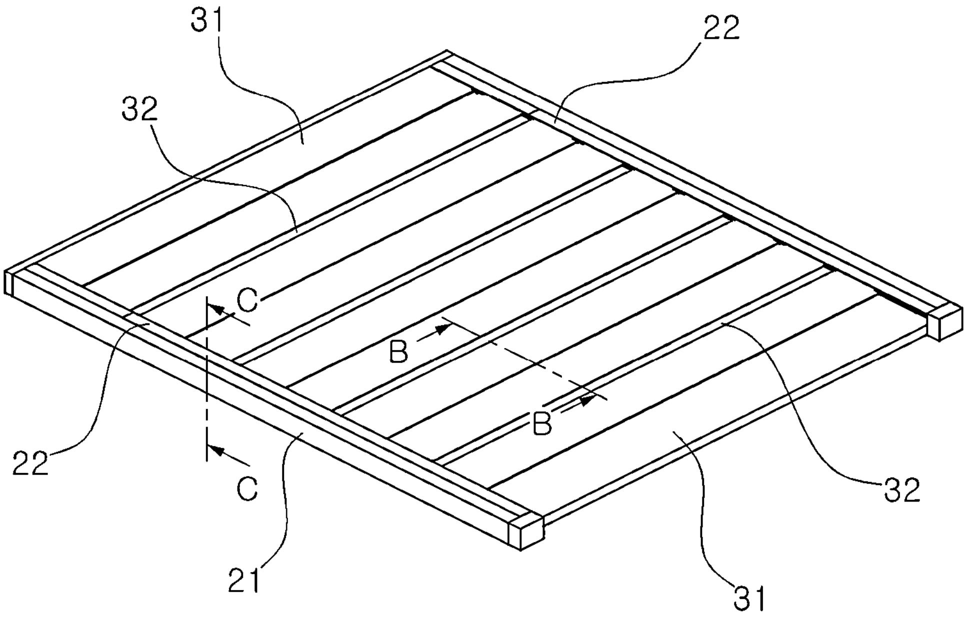
FIG. 19 is a perspective view illustrating a state in which the foldable loading box cover assembly for a vehicle having the pop-up type rail according to the present disclosure is unfolded.

FIG. 19 illustrates a perspective view of a state in which the cover unit 30 is fully unfolded.

As illustrated in FIG. 20, when the cover unit 30 is fully unfolded, the upper portion of the loading box 10 is closed. In addition, when the cover unit 30 is fully unfolded, the slats and the connectors 32 may be sealed by the slat weather strip 34 and the connector weather strip 35 installed on the slats 31 and the connectors 32.

Figure 21:
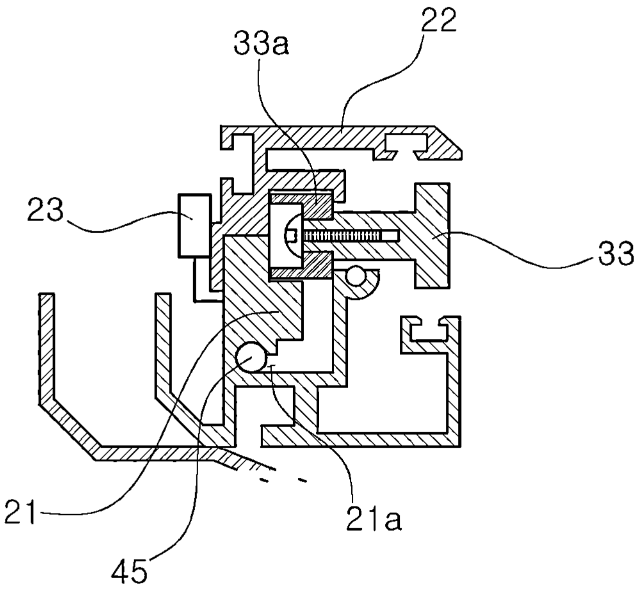
FIG. 21 is a cross-sectional view of the cover assembly taken along line C-C in FIG. 19.

In the state in which the cover unit 30 is fully unfolded, the upper rail 22 covers the upper surface of the lower rail 21 (see FIG. 21). Since the lower surface of the upper rail 22 and the upper surface of the lower rail 21 may be open, when the upper rail 22 may overlap the lower rail 21, the upper rail 22 may become in a state of being coupled to the lower rail 21, thereby preventing foreign substances from being introduced therebetween.

Meanwhile, in order to open the loading box 10 by folding the cover unit 30 in from state in which the cover unit 30 is unfolded and the cover unit 30 closes the loading box 10, the above-described unfolding process of the cover unit 30 may be performed in an inverse order.

In other words, when the driving motor 43 rotates conversely, the cable 45 may pull the rear end of the remote or most distal slat 31 toward the front of the vehicle 1. Thereafter, the slats 31 may be folded and become in a state of being inclined with respect to the lower rail 21, and some of the brackets 33 may move up along the upper end of the folded slats 31. At the same time, the upper rail 22 may be popped up by being separated from the lower rail 21.

As the cable 45 further pulls the slats 31, the upper ends of the slats 31 may further move up while being inclined to become a state of being perpendicular to the ground from a state of being parallel to the ground, and the popped-up amount of the upper rail 22 may increase.

Thereafter, when the cable 45 maximally pulls the slats 31, the slats 31 may become the state of being perpendicular to the ground, and the cover unit 30 may be folded maximally so that the upper portion of the loading box 10 is opened. In addition, the upper rail 22 may become a state of being maximally popped up with respect to the lower rail 21.

While several embodiments of the present disclosure have been described with reference to the accompanying drawings, those of ordinary skill in the art should understand that the present disclosure may be carried out in various other specific forms without departing from the inventive concept of the present disclosure and without changing the technical spirit or an essential feature of the present disclosure. Therefore, it should be understood that the above-described embodiments are illustrative in all aspects and do not limit the present disclosure.

What is claimed is:

1. A foldable loading box cover assembly for a vehicle, the assembly comprising:

a cover unit including a plurality of slats and being foldable to open or unfoldable to cover an upper portion of a loading box of the vehicle; and a rail unit disposed in an unfolding direction of the cover unit at the upper portion of the loading box and configured to pop up for guiding an upper end portion and a lower end portion of the plurality of slats to slide, wherein the rail unit includes a lower rail installed at an upper end of the loading box of the vehicle in an unfolding direction of the cover unit and configured to guide the lower end portion of the plurality of slats, and an upper rail installed parallel to the lower rail above the lower rail and configured to guide the upper end portion of the plurality of slats.

2. The assembly of claim 1, wherein each slat of the plurality of slats is alternately connected to another adjacent slat and is folded or unfolded to or from a loading box of the vehicle.

3. The assembly of claim 1, further comprising a plurality of connecting links connecting the lower rail to the upper rail, wherein, when the cover unit is folded, the upper rail pops up from the lower rail to guide the upper end of the plurality of slats to slide.

4. The assembly of claim 3, wherein the plurality of connecting links is provided at intervals in a longitudinal direction of the vehicle.

5. The assembly of claim 4, wherein:

at least any one connecting link of the plurality of connecting links is connected to a sub-link;

the sub-link is connected to a connecting bar installed on the lower rail along the lower rail; and when the cover unit is unfolded, one slat pulls the connecting bar to support the sub-link to a rear of the vehicle.

6. The assembly of claim 5, wherein the sub-link is connected to the one connecting link, among the plurality of connecting links, that is adjacent to a rear end of the vehicle.

7. The assembly of claim 6, wherein, when the cover unit is unfolded, a remote slat positioned closest to the rear end of the vehicle supports the connecting bar toward the rear of the vehicle.

8. The assembly of claim 7, wherein the connecting bar is supported toward the rear of the vehicle by a carrier connected to the remote slat positioned closest to the rear end of the vehicle.

9. The assembly of claim 8, wherein the connecting bar is connected to the carrier and supported toward the rear of the vehicle by a cable configured to fold or unfold the plurality of slats.

10. The assembly of claim 5, wherein the connecting bar is elastically supported by a spring toward the front of the vehicle.

11. The assembly of claim 1, further comprising:

a bracket connecting two adjacent slats among the plurality of slats; and a slider in the form of a roller installed on the bracket and configured to slide on the lower rail or the upper rail.

12. The assembly of claim 11, wherein, when the cover unit is folded:

a slider installed on the bracket connecting the upper end of the two adjacent slats slides along a lower surface of the upper rail; and a slider installed on another bracket connecting the lower end of another two slats slides along an upper surface of the lower rail.

13. The assembly of claim 1, wherein the nearest slat disposed closet to a front end of the vehicle among the plurality of slats is rotatably installed on the lower rail.

14. The assembly of claim 1, further comprising a connector disposed between two adjacent slats and each being pivotally connected thereto.

15. The assembly of claim 14, wherein a weather strip is disposed and configured to seal between the two adjacent slats or between each of the two adjacent slats and the connector.

16. The assembly of claim 1, further comprising:

a driving motor;

a driving gear configured to be rotated by the driving motor; and a cable engaged with the driving gear by a spiral on an outer circumferential surface thereof or by teeth provided in a longitudinal direction of the cable, wherein the cable is configured to push or pull an end portion of the cover unit according to the rotation of the driving gear, and wherein a remote slat among the plurality of slats of the cover unit that is positioned maximally spaced apart from the driving motor is pushed to unfold the cover unit or pulled to fold the cover unit.

17. The assembly of claim 16, wherein a pair of cables is provided and connected to both ends of the remote slat of the cover unit positioned to be maximally spaced apart from the driving motor.

18. The assembly of claim 16, further comprising a housing wherein:

the driving motor and the driving gear are installed in the housing:

the housing is fixed to a front end of the lower rail; and a cable groove in which the cable is installed is formed in the housing.

19. A vehicle with a loading box, the vehicle comprising:

a cover unit including a plurality of slats and being foldable to open or unfoldable to cover an upper portion of the loading box; and a rail unit disposed in an unfolding direction of the cover unit at the upper portion of the loading box and configured to pop up for guiding an upper end portion and a lower end portion of the plurality of slats to slide, wherein the rail unit includes a lower rail installed at an upper end of the loading box of the vehicle in an unfolding direction of the cover unit and configured to guide the lower end portion of the plurality of slats, and an upper rail installed parallel to the lower rail above the lower rail and configured to guide the upper end portion of the plurality of slats.

20. A foldable loading box cover assembly for a vehicle, the assembly comprising:

a cover unit including a plurality of slats and being foldable to open or unfoldable to cover an upper portion of a loading box of the vehicle;

a rail unit disposed in an unfolding direction of the cover unit at the upper portion of the loading box and configured to pop up for guiding an upper end portion and a lower end portion of the plurality of slats to slide;

a driving motor;

a driving gear configured to be rotated by the driving motor; and a cable engaged with the driving gear by a spiral on an outer circumferential surface thereof or by teeth provided in a longitudinal direction of the cable, wherein the cable is configured to push or pull an end portion of the cover unit according to the rotation of the driving gear, and wherein a remote slat among the plurality of slats of the cover unit that is positioned maximally spaced apart from the driving motor is pushed to unfold the cover unit or pulled to fold the cover unit.

* * * * *